Nov. 23, 1965 A. W. COMPOLY 3,219,946
TRANSISTORIZED STATIC INVERTERS
Filed Aug. 29, 1960
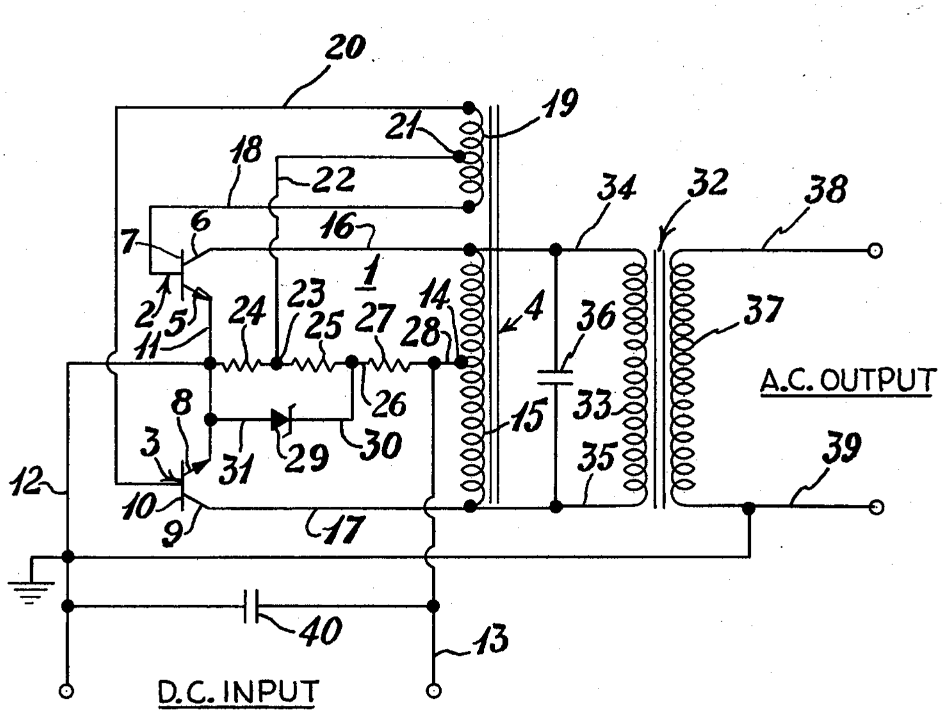
INVENTOR.
ALBERT W. COMPOLY
BY James M. Nickels
ATTORNEY

United States Patent Office 3,219,946

Patented Nov. 23, 1965

3,219,946

TRANSISTORIZED STATIC INVERTERS

Albert William Compoly, Holmdel, N.J., assignor to The Bendix Corporation, Eatontown, N.J., a corporation of Delaware

Filed Aug. 29, 1960, Ser. No. 52,681

3 Claims. (Cl. 331—113)

The present invention relates to static inverters and more particularly to transistorized static inverters.

Transistors used in static inverters will go into thermal runaway and become self destructive if a short circuit should develop across the output of the static inverter. This has been a determent to the use of static inverters.

The present invention provides a static inverter in which the transistors used therein are protected from thermal runaway, upon a short circuit occurring across the output, by controlling the forward bias voltage of the transistors. As the temperature of the transistors rises, less voltage is required for the forward bias, as the temperature goes down, the bias requirement goes up. Means are provided to control the forward bias voltage in accordance with the temperature.

It is an object of the invention to provide an improved static inverter.

Another object of the invention is to provide short circuit protection for a static inverter.

Another object of the invention is to provide means for preventing thermal runaway of transistors in a static inverter.

Another object of the invention is to provide improved short circuit protection for an electrical circuit.

The above and other objects and features of the invention will appear more fully hereinafter from a consideration of the following description taken in connection with the accompanying drawing wherein one embodiment is illustrated by way of example.

In the drawing:

The single figure is a schematic diagram of a static inverter embodying the invention.

Referring now to the drawing, an oscillator circuit indicated generally by the numeral 1 includes transistors 2 and 3 and transformer 4. The transistors 2 and 3 are illustrated as NPN transistors, however with slight modifications PNP transistors could be utilized. The transistor 2 has an emitter 5, collector 6 and base 7, and the transistor 3 has an emitter 8, collector 9 and base 10.

Emitters 5 and 8 are connected together by a conductor 11 which is connected to one side of a D.C. source (not shown) by conductor 12. The other side of the D.C. source is connected by conductor 13 to center tap 14 of load winding 15 on the transformer 4. One side of the winding 15 is connected by conductor 16 to the collector 6 of the transistor 2 and the other side of the winding 15 is connected by conductor 17 to the collector 9 of the transistor 3.

The base 7 of the transistor 2 is connected by a conductor 18 to one side of a feedback winding 19 on the transformer 4 and the other side of the winding 19 is connected by a conductor 20 to the base 10 of the transistor 3. The winding 19 has a center tap 21 which is connected by a conductor 22 to a junction 23 between resistors 24 and 25. The other end of the resistor 24 is connected to the conductor 11 and the other end of the resistor 25 is connected by conductor 26 to one end of resistor 27. The other end of the resistor 27 is connected by conductor 28 to the center tap 14 of the winding 15. A zener diode 29 is connected across the resistors 24 and 25 by conductors 30 and 31. The resistor 25 has a positive temperature coefficient and the zener diode 29 has a negative temperature coefficient and both are located in close proximity to the transistors 2 and 3 in order to follow the temperature thereof.

An output transformer 32 has a primary winding 33 connected by conductors 34 and 35 across the winding 15 of the transformer 4. A capacitor 36 may be connected across the winding 33. A secondary winding 37 of the transformer 32 is connected to a suitable load (not shown) by conductors 38 and 39. A capacitor 40 may be connected across the D.C. input if desired.

In operation, the bias voltage of the transistors is regulated by the zener diode 29 which has a negative temperature coefficient in conjunction with resistor 25 which has a positive temperature coefficient. The zener diode 29 regulates the voltage across resistors 24 and 25 and holds it constant for any predetermined given temperature with input voltage changes over a wide range. As the temperature varies from the predetermined value, the regulated voltage varies inversely therewith. The resistors 24 and 25 form a voltage divider network that supplies the bias voltage to the transistors 2 and 3 through the feedback winding 19 of the transformer 4.

Inasmuch as resistor 25 has a positive temperature coefficient, its resistance will vary directly with temperature. The voltage appearing across the base of transistors 2 and 3 is proportional to the ratio of the resistor 24 to the sum of the resistors 24 and 25.

Under a short circuited output condition, oscillations will cease and the transistors 2 and 3 would both conduct D.C. current due to the forward bias voltage. This current would cause heating in the transistors and without compensation, would cause thermal runaway. As the temperature of the transistors rises, the resistor 25 and diode 29 being located adjacent to the transistors, would also rise in temperature. The diode 29 would cause a drop in the regulated voltage and the resistor 25 would change the ratio of the voltage divider network which would both tend to reduce the bias voltage on the transistors. As the bias voltage is reduced, the collector current of the transistors is also reduced and less heating of the transistor occurs. A stabilized temperature will result at which point there will be no further increase in collector current or temperature. This stabilized temperature will be within the ratings of the transistors. Upon the short circuit being removed from the output, the inverter will start oscillations and will deliver power to its rated load.

Although only one embodiment of the invention has been illustrated and described, various changes in the form and relative arrangement of the parts, which will now appear to those skilled in the art, may be made without departing from the scope of the invention.

What is claimed is:

1. A transistor inverter comprising a pair of transistors each having a collector, base and emitter, a transformer having a first and a second winding, a center tap on each of said winding, circuit means connecting the emitters of said transistors together, the collector of one of said transistors being connected to one end of said first winding and the collector of the other of said transistors being connected to the other end of said first winding, a source of direct current having one side connected to the center tap on said first winding and the other side to said emitters, further circuit means connecting the base on one of said transistors to one end of said second winding and the base of the other of said transistors to the other side of said second winding, and biasing means for said transistors including a voltage divider network connected across said source of direct current, said network including first and second resistors with the junction of said resistors being connected to the center tap on said second winding, one of said resistors having a positive temperature coefficient and a zener diode connected across said resistors and having a negative temperature coefficient.

2. In a transistor oscillator having a direct current input connected across the emitter and collector of the transistors, the improvement comprising means for biasing the transistors in said oscillator in accordance with temperature and includes a first resistor, a second resistor, circuit means connecting said resistors in series across said direct current source, a zener diode connected across said resistors and having a negative temperature coefficient to regulate the voltage inversely with temperature, means connecting the junction of said resistors to the base of said transistors, and one of said resistors having a positive temperature coefficient to change the ratio of said resistors in accordance with temperature changes.

3. The combination as set forth in claim 2 in which said resistor with a positive temperature coefficient and said zener diode are located adjacent to said transistors.

References Cited by the Examiner

UNITED STATES PATENTS

| | | | |
|---|---|---|---|
| 2,875,351 | 2/1959 | Collins | 331—113 |
| 2,957,979 | 10/1960 | Kammer | 331—109 |
| 2,968,738 | 1/1961 | Pintell | 331—109 |
| 3,029,398 | 4/1962 | McComb | 331—109 |
| 3,050,644 | 8/1962 | Ironside | 307—88.5 |
| 3,051,933 | 8/1962 | Cressey et al. | 331—186 |
| 3,102,217 | 8/1963 | Bullen | 331—117 |
| 3,125,726 | 3/1964 | Clifton | 331—113 |

OTHER REFERENCES

Electronics, Sept. 4, 1959, pages 56–58.

ROY LAKE, *Primary Examiner.*

HERMAN KARL SAALBACH, JOHN KOMINSKI, *Examiners.*